(12) United States Patent
Lee

(10) Patent No.: US 6,180,202 B1
(45) Date of Patent: Jan. 30, 2001

(54) LARGE CAPACITY DISK AND METHOD FOR MANUFACTURING THE SAME

(75) Inventor: Jo-won Lee, Suwon (KR)

(73) Assignee: Samsung Electronics Co., Ltd., Suwon (KR)

(*) Notice: Under 35 U.S.C. 154(b), the term of this patent shall be extended for 0 days.

(21) Appl. No.: 09/127,731

(22) Filed: Aug. 3, 1998

(30) Foreign Application Priority Data

Dec. 17, 1996 (KR) .................................. 96-66936

(51) Int. Cl.$^7$ ........................................ G11B 5/66

(52) U.S. Cl. .............. 428/65.3; 428/694 T; 428/694 TS; 428/65.7; 428/900; 427/128; 427/129; 427/130; 427/585

(58) Field of Search .................. 428/694 T, 694 TS, 428/65.3, 65.7, 900; 427/128–130, 585

(56) References Cited

U.S. PATENT DOCUMENTS

| | | | | |
|---|---|---|---|---|
| 5,134,038 | * | 7/1992 | Baseman | 428/611 |
| 5,413,835 | * | 5/1995 | Ikeda | 428/141 |
| 5,474,830 | * | 12/1995 | Yamaguchi | 428/141 |
| 5,482,785 | * | 1/1996 | Mahvan | 428/611 |
| 5,721,033 | * | 2/1998 | Teng | 428/65.3 |

OTHER PUBLICATIONS

Bennett, "Self–Assembled InSb and GaSb Quantum Dots . . . " J. Vac. Sci. Technol. 13/4(9), May/Jun. 1996.*

B.R. Bennett et al., "Self–assembled InSb and GaSb quantum dots on GaAs(001)," *J. Vac. Sci. Technol. B*, vol. 14, No. 3, May/Jun. 1996, pp. 2195–2198.

Peter R. Krauss et al., "Fabrication of single–domain magnetic pillar array of 35 nm diameter and 65 Gbits/in.$^2$ density," *J. Vac. Sci. Technol. B*, vol. 12, No. 6, Nov./Dec. 1994, pp. 3639–3642.

\* cited by examiner

*Primary Examiner*—Leszek Kiliman
(74) *Attorney, Agent, or Firm*—Burns, Doane, Swecker & Mathis, L.L.P.

(57) ABSTRACT

A large capacity disk in which information of not less than 50 Gbit can be stored and a method for manufacturing the same are provided. In the present invention, a disk for an apparatus for storing information of super high capacity, which can be mass produced at low costs, is manufactured by forming a Cr layer and a magnetic layer on the seed layer, using a three-dimensional island grown particle of nm scale as the seed layer without performing E-beam lithography. In the disk manufactured as mentioned above, it is possible to control the information storage capacity as desired since it is possible to control the size of the single domain, i.e., the bit according to deposition conditions. Also, the domains manufactured as mentioned above are not coupled with each other. Accordingly, the signal-to-noise ratio is high.

16 Claims, 2 Drawing Sheets

LARGE CAPACITY DISK AND METHOD FOR MANUFACTURING THE SAME

BACKGROUND OF THE INVENTION

1. Field of the Invention

The present invention relates to a disk on which a large amount of information can be recorded and a method for manufacturing the same, and more particularly, to a large capacity disk on which at least 50 GB of information can be stored and a method for manufacturing the same.

2. Description of the Related Art

FIG. 1 is an extracted and enlarged sectional view of a conventional disk. As shown in FIG. 1, the conventional disk has a structure in which a Cr layer 2 and a magnetic layer 3 are sequentially stacked on a substrate 1. Information storing apparatuses including a hard disk drive (HDD) in which a disk having a similar structure are developed as follows. A disk of a super high capacity of at least 50 Gbit is required to have a structure different from that of the conventional disk since the size of a bit is on a nm scale. Therefore, a new manufacturing method different from that of the conventional disk is required. A method of manufacturing a pillar shape having a diameter of 35 nm by electroplating or a reactive ion etching (RIE) after an E-beam lithography and using it as a single domain, i.e., one bit has been proposed as described in J.Vac.Sci.Tech, Book12, p.3639,1994.

However, mass production cannot be performed by the method considering the level of the current technology. In particular, throughput of the E-beam lithography is low, thus lowering yield of the disk. Therefore, a new manufacturing method by which mass production can be performed and the throughput can be improved is required.

SUMMARY OF THE INVENTION

To solve the above problem(s), it is an objective of the present invention to provide a high density large capacity disk which can be mass produced since a manufacturing process can be performed at a high speed and a method for manufacturing the same.

Accordingly, to achieve the above objective, there is provided a disk, comprising a substrate, a seed layer formed of a discrete island of a predetermined diameter and stacked on the substrate, a Cr layer having a predetermined thickness and discretely stacked on the seed layer, and a magnetic layer magnetically and discretely formed on the Cr layer by a predetermined distance.

In the present invention, the substrate is formed of at least one selected from the group consisting of GaAs, Si, glass, quartz, and Al alloy. The seed layer is formed of materials including InAs and SiGe in which the island can be three dimensionally grown. The diameter of the island is not more than 100 nm in the seed layer. The thickness of the Cr layer is not more than 100 nm. The magnetic layer includes rare earth ferromagnetic materials including Co—X—Y or Sm—Co when X and Y are transition metals. The thickness of the magnetic layer is not more than 100 nm.

To achieve the above objective, there is provided a method for manufacturing a disk, comprising the steps of (a) forming a seed layer on a substrate by a self assembly growth method by discretely growing an island of a predetermined diameter, (b) forming a Cr layer of a predetermined thickness on the seed layer, and (c) magnetically forming a discrete magnetic layer on the Cr layer by a predetermined distance.

In the present invention, the substrate is formed of at least one selected from the group consisting of GaAs, Si, glass, quartz, and Al alloy. Materials including InAs and SiGe in which a three dimensional island growth can be performed are formed by being deposited by an MBE method or an MOCVD method in the step (a). The diameter of the island of the seed layer is formed to be not more than 100 nm in the step (a). The thickness of the Cr layer is formed to be not more than 100 nm in the step (b), The magnetic layer is formed to include rare earth ferromagnetic materials including Co—X—Y or Sm—Co when X and Y are transition metals. The diameter of the island of the magnetic layer is formed to be not more than 100 nm in the step (a).

BRIEF DESCRIPTION OF THE DRAWING(S)

The above objective and advantages of the present invention will become more apparent by describing in detail a preferred embodiment thereof with reference to the attached drawings in which.

DESCRIPTION OF THE PREFERRED EMBODIMENT(S)

Hereinafter, a large capacity disk according to the present invention and a method for manufacturing the same will be described with reference to the attached drawings.

Methods for manufacturing a quantum dot by self assembly (self organizing, 3D island growth, and stranski-krastanow growth) on Si including semiconductors of group III–V or other materials have been proposed (J. Vac. Sci. Tech, Book14, p.2195, 1996). In the large capacity disk according to the present invention, the memory structure of a recording medium is discretely formed by forming a seed layer using the self assembly method.

The self assembly method employs a phenomenon which occurs when a material having a lattice constant different from that of GaAs such as InAs is heteroepitaxially grown on a GaAs substrate by an MBE method or an MOCVD method. Namely, when an upper layer is grown on the GaAs substrate, stress is generated in an upper layer due to a difference of the lattice constant between the substrate and the upper layer. These thin films of the upper layer forming a first layer to a third layer are two-dimensionally grown since thin film is less affected by stress, and thin films forming a fourth layer and thereafter are three-dimensionally grown due to the overlap of stress, thus formed in form of a dot-shaped island. A recording medium having a discrete structure is formed on the dot shaped island which is discretely formed as a seed layer.

Figure 1:
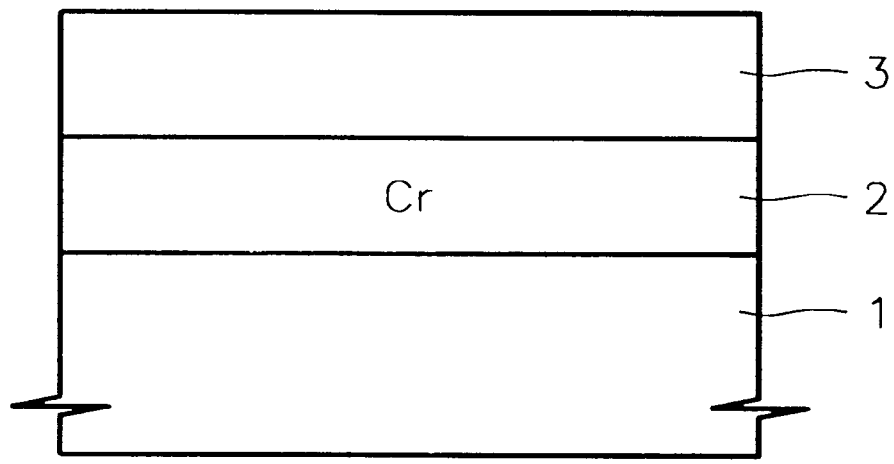
FIG. 1 is an extracted and enlarged sectional view of a conventional disk.
Figure 2:
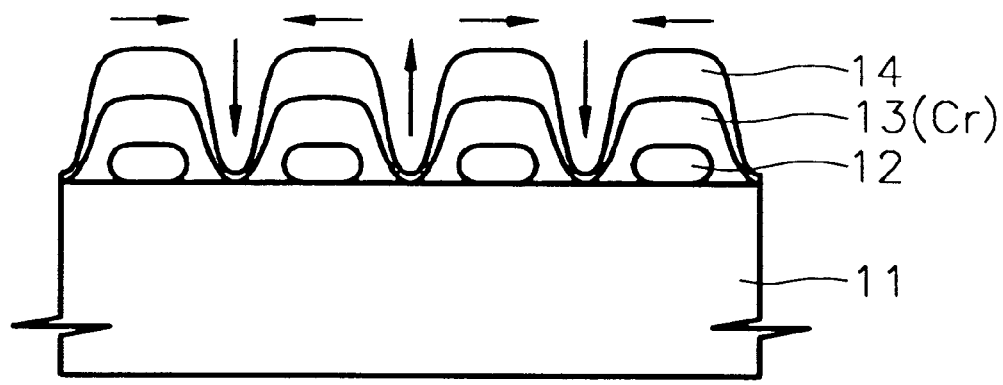
FIG. 2 is an extracted and enlarged sectional view of a large capacity disk according to the present invention.

FIG. 2 is an enlarged sectional view of a portion of the large capacity disk according to the present invention. As shown in FIG. 2, the large capacity disk according to the present invention has a structure in which a substrate 11, a seed layer 12, a Cr layer 13, and a magnetic layer 14 are sequentially stacked.

A semiconductor substrate of group III–V such as Si and GaAs or a substrate formed of glass, quartz, and Al alloy is used as the substrate 11, Materials including InAs and SiGe in which three dimensional growth of an island can be performed are used as the seed layer 12. The diameter of the seed layer 12 island is formed to be not more than 100 nm.

The thickness of the Cr layer 13 is formed to be not more than 100 nm. Materials including rare earth ferromagnetic materials including Co—X—Y (X and Y are transition metals) or Sm—Co are used as the magnetic layer 14. The diameter of the island of the magnetic layer 14 is formed to be not more than 100 nm.

A method for manufacturing a large capacity disk having the above structure will be described in detail with reference to FIGS. 3 through 5.

Figure 3:
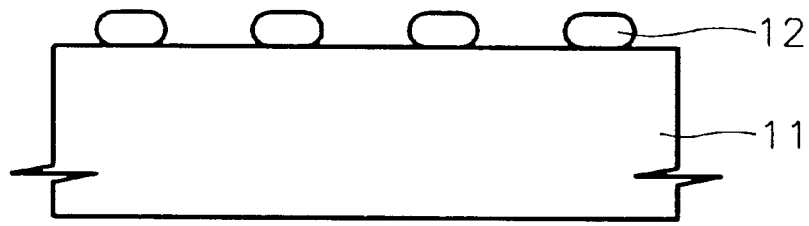
FIGS. 3 through 5 are extracted and enlarged sectional views showing states after the steps of the manufacturing process of the large capacity disk of FIG. 2.

First, as shown in FIG. 3, the seed layer 12 formed of a quantum dot (particle), i.e., an island of a nm scale is formed using the methods (please refer to J. Vac. Sci. Tech, Book14, p.2195, 1996) for manufacturing the quantum dot such as the above mentioned self assembling (self organizing, 3D island growth, and stranski-krastanow growth) method on a semiconductor substrate 1 such as GaAs and Si or a substrate 1 formed of glass, quartz, and Al alloy (step a). Here, the seed layer 12 is formed by depositing materials in which the island can be three dimensionally grown, including InAs and SiGe by the MBE method or the MOCVD method. The diameter of the island of the seed layer 12 is preferably formed to be not more than 100 nm.

Figure 4:
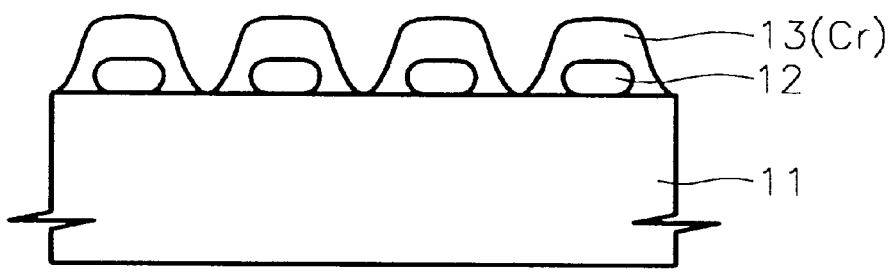

Then, as shown in FIG. 4, a Cr layer 13 having a thickness of not more than 100 nm is formed on the seed layer 12 (step b).

Figure 5:
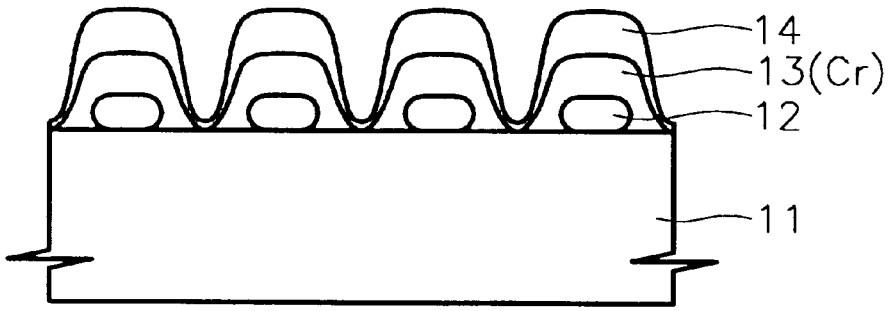

Then, as shown in FIG. 5, a disk is completed by forming a magnetic layer 14 in which the island having the diameter of not more than 100 nm is grown on the Cr layer 13 (step c). Here, the magnetic layer 14 is formed of materials including rare earth ferromagnetic materials including Co—X—Y (X and Y are transition metals) or Sm—Co.

In such a manufacturing method, the bit size must be decreased in order to increase the storage density of the recording medium. As the bit size decreases, the signal-to-noise (S/N) ratio is reduced. Thus, the grain size must decrease. However, when the grain size is decreased, the magnetic switching energy becomes smaller than the thermal energy at normal temperatures. Accordingly, magnetic polarization becomes unstable, thus erasing recorded data (a superparamagnetic limit). In order to overcome such problem, the large capacity disk according to the present invention is manufactured to have a discrete record structure using the above discrete seed layer. In the discrete record structure, the grain size is small. However, since grains are strongly combined with each other unlike a current continuous record structure, the superparamagnetic limit increases more than several times in the case of a material having the same coercivity. Also, the grain size differs in every material. In the material having the large switching energy and coercivity, the grain size reaching the superparamagnetic limit can be enlarged.

In the method for manufacturing the quantum disk according to the present invention, it is possible to manufacture a single domain corresponding to one bit is without performing E-beam lithography and subsequent processes by depositing the Cr layer 13 and the magnetic layer 14 on the seed layer 12, using the quantum dot (particle) on a nm scale as the seed layer 12. Therefore, it is possible to mass produce a disk of super high capacity with high yield. Furthermore, it is possible to manufacture a disk of super high capacity of not less than 50 Gbit, using the seed layer by the self assembly growth (self organizing growth, 3D island growth, stranki-krastanow growth) method. The disk manufactured as mentioned above is used as a disk for HDD and a disk for video-on-demand (VOD) in which a high capacity storage is required, after undergoing the following processes.

As mentioned above, in the present invention, a disk for an apparatus for storing information of super high capacity, which can be mass produced at low costs, is manufactured by forming the Cr layer and the magnetic layer on the seed layer, using the three-dimensional, island grown particle of nm scale as the seed layer without performing E-beam lithography. In the disk manufactured as mentioned above, it is possible to control the information storage capacity as desired since it is possible to control the size of the single domain, i.e., the bit according to deposition conditions. Also, the domains manufactured as mentioned above are not coupled with each other. Accordingly, the signal-to-noise ratio is high. Therefore, the disk manufactured as mentioned above is used as a horizontal and vertical magnetic recording disk.

What is claimed is:

1. A disk, comprising:
   a substrate;
   a seed layer formed of discrete islands, said seed layer being on the substrate, wherein said seed layer is formed of materials including InAs and SiGe;
   a Cr layer having a thickness, said Cr layer being on the seed layer; and
   a magnetic layer discretely formed on the Cr layer.

2. A disk claimed in claim 1 wherein the substrate is formed of at least one selected from the group consisting of GaAs, Si, glass, quartz, and Al alloy.

3. A disk claimed in claim 1, wherein the islands are three dimensionally grown.

4. A disk claimed in claim 1, wherein the diameter of the islands are not more than 100 nm in the seed layer.

5. A disk claimed in claim 1, wherein the thickness of the Cr layer is not more than 100 nm.

6. A disk claimed in claim 1, wherein the magnetic layer includes rare earth ferromagnetic materials including Co—X—Y or Sm—Co when X and Y are transition metals.

7. A disk claimed in claim 1, wherein the thickness of the magnetic layer is not more than 100 nm.

8. A method for manufacturing a disk, comprising the steps of:
   (a) forming a seed layer on a substrate by a self assembly growth method by discretely growing discrete islands of a diameter, wherein said seed layer is formed of materials including InAs and SiGe;
   (b) forming a Cr layer of a thickness on the seed layer; and
   (c) forming a discrete magnetic layer on the Cr layer.

9. A method claimed in claim 8, wherein the substrate is formed of at least one selected from the group consisting of GaAs, Si, glass, quartz, and Al.

10. A method claimed in claim 8, wherein a three dimensional island growth is performed, said materials being deposited by an MBE method or an MOCVD method in the step (a).

11. A method claimed in claim 8, wherein the diameter of the islands of the seed layer is formed to be not more than 100 nm in the step (a).

12. A method claimed in claim 8, wherein the thickness of the Cr layer is formed to be not more than 100 nm in the step (b).

13. A method claimed in claim 8, wherein the magnetic layer includes rare earth ferromagnetic materials including Co—X—Y or Sm—Co when X and Y are transition metals.

14. A method claimed in claim 8, wherein the diameter of the islands of the magnetic layer are not more than 100 nm in the step (a).

15. A disk as claimed in claim 1, wherein a discrete island of said seed layer, a portion of said Cr layer on top of said discrete island and a portion of said magnetic layer on top of said Cr layer, above said discrete island forms a single domain corresponding to one bit.

16. A method as claimed in claim 8, wherein a discrete island of said seed layer, a portion of said Cr layer on top of said discrete island and a portion of said magnetic layer on top of said Cr layer, above said discrete island forms a single domain corresponding to one bit.

* * * * *